United States Patent
Liao

(10) Patent No.: US 9,664,514 B2
(45) Date of Patent: May 30, 2017

(54) LASER LEVEL ASSEMBLY

(71) Applicant: PRECASTER ENTERPRISES CO., LTD., Taichung (TW)

(72) Inventor: Chen-Yu Liao, Taichung (TW)

(73) Assignee: Precaster Enterprises Co., Ltd., Taichung (TW)

( * ) Notice: Subject to any disclaimer, the term of this patent is extended or adjusted under 35 U.S.C. 154(b) by 130 days.

(21) Appl. No.: 14/877,934

(22) Filed: Oct. 8, 2015

(65) Prior Publication Data

US 2017/0102237 A1 Apr. 13, 2017

(51) Int. Cl.
*G01C 15/00* (2006.01)

(52) U.S. Cl.
CPC .................................. *G01C 15/002* (2013.01)

(58) Field of Classification Search
CPC ...... G01C 15/002; G01C 15/004; G01C 9/34; G01C 2009/066; G01C 9/06; G01C 15/00; G01C 15/02
USPC ............................. 33/291, 286, 227, DIG. 21
See application file for complete search history.

(56) References Cited

U.S. PATENT DOCUMENTS

| | | | | |
|---|---|---|---|---|
| 6,763,596 | B1* | 7/2004 | Puri | G01C 15/002 33/227 |
| 2004/0177523 | A1* | 9/2004 | Chang | G01C 15/004 33/281 |
| 2006/0010698 | A1* | 1/2006 | Hayes | G01C 15/004 33/286 |
| 2007/0204474 | A1* | 9/2007 | Lin | G01C 15/002 33/286 |
| 2009/0193671 | A1* | 8/2009 | Sergyeyenko | G01C 15/02 33/290 |
| 2010/0050447 | A1* | 3/2010 | Kallabis | G01C 15/004 33/227 |
| 2010/0293798 | A1* | 11/2010 | Wilson | G01C 15/105 33/286 |

\* cited by examiner

*Primary Examiner* — Yaritza Guadalupe-McCall
(74) *Attorney, Agent, or Firm* — Rosenberg, Klein & Lee

(57) ABSTRACT

A laser level assembly includes a base kit and an adjustment unit which is pivotably connected to the base kit. The adjustment unit has a block, a pivotable member, multiple shafts and multiple bearings. The shafts extends through the bearings and the block such that the block is pivotable relative to the connection member of the base kit, and the pivotably member is pivotable to the block. The pivotable member is connected to the laser level. The pivotable member is pivotable about an axis that is perpendicular to the pivotable axis of the connection member. The laser level is always maintained at a position that the laser beam is parallel to a desired plane.

5 Claims, 8 Drawing Sheets

LASER LEVEL ASSEMBLY

BACKGROUND OF THE INVENTION

1. Fields of the Invention

The present invention relates to a laser level assembly, and more particularly, to a laser level assembly which maintains the laser level at the horizontal or vertical position relative object to be measured.

2. Descriptions of Related Art

The conventional way to obtain a precise horizontal plane by using a level tool which generally has two rooms defined therein, and a horizontal bar and a vertical bar are respectively located in the two rooms. The horizontal bar is supported at the fulcrum and has a central line which is to be aligned with a basic line on the level tool. The vertical bar has the similar vertical line to be aligned with the basic line of the level tool. The level tool has widows so as to check the alignment. Multiple adjustment lines are formed on the windows so as to correct the alignment when the object is located at a distance.

However, if the object to be measured is located at a far distance that is longer than the level tool itself, the user has to operate the level tool several times to complete the distance. This cannot get the precise result and takes too much time.

The modern laser level uses a laser unit to generate a laser beam which is arranged to be parallel the floor or a horizontal reference plane, such that the problem of distance between the level tool and the object to be measure is improved. The laser unit is usually pivotably connected to a base kit so that the laser unit is always maintained at a vertical status regardless of the inclination of the place that the laser unit is used. However, the laser unit is bulky and heavy, the bearing for supporting the shaft of the laser unit is quickly worn out. Therefore, an even bigger base kit has to be prepared and the larger the base kit is used, the heavier load for the user is suffered.

The present invention intends to provide a laser level assembly to eliminate the shortcomings mentioned above.

SUMMARY OF THE INVENTION

The present invention relates to a laser level assembly and comprises a base kit and an adjustment unit. The base kit has a base and a frame unit which is connected to the base. The frame unit has one end connected to the base, the other end of the frame unit is pivotably connected to the adjustment unit. The frame unit has two installation holes. The adjustment unit has a block, a pivotal member, multiple shafts and multiple bearings. The block has a first hole defined through the center thereof, and two second holes are located on two ends of the first hole. Two first shaft holes, two second shaft holes and two third shaft holes are defined through the block, wherein the first shaft holes communicate with the first hole, the second shaft holes communicate with one of the two second holes, and the third shaft holes communicate with the other one of the two second holes. The axis of the two first shaft holes are perpendicular to the axis of each of the second shaft holes and the third shaft holes. The pivotal member is pivotably located in the first hole and has an engagement hole. Each of the two installation holes has a bearing received therein, another bearing is received in the engagement hole. Each of the two installation holes and the engagement hole has a flange projecting from the inner periphery thereof so as to be in contact with the bearing corresponding thereto. One of the shafts extends through the two first shaft holes, the bearing in the first shaft holes, the bearing in the engagement hole and the engagement hole of the pivotal member. The shaft extending through the first shaft holes contacts the inside of each of the two first shaft holes and the bearing in the pivotal member at multiple points. Another one shaft extends through one of the installation holes and the bearing in the installation hole, and the two second shaft holes. The shaft extending through the second shaft holes contacts the inside of each of the two second shaft holes and the bearing in the installation hole at multiple points. Yet another one shaft extends through the other one of the installation holes and the bearing in the installation hole, and the two third shaft holes. The shaft extending through the third shaft holes contacts the inside of each of the two third shaft holes and the bearing in the installation hole at multiple points. The block is pivotable about the two shafts extending through the second and third shaft holes. The pivotal member is pivotable about the shaft extending through the first shaft holes, and is pivotable relative to the block.

Preferably, the frame unit has two posts extending from the base. A connection member is connected to two respective distal ends of the two posts. Two lugs extend from the top of the connection member and each lug has one of the installation holes. The two lugs are inserted into the two second holes of the block.

Preferably, the two lugs are perpendicular to the connection member.

Preferably, the two lugs each have a first section, a second section and a connection section which is connected between the first and second sections. The first and second sections are parallel to each other. The two second sections each have a distance from the top of the connection member. Each of the two second sections has one of the two installation holes. The block is inserted between the two second sections and the top of the connection member. The two second sections are inserted into the two second holes.

Preferably, each of the two first shaft holes, the two second shaft holes and the two third shaft holes has a sleeve securely received therein. Each sleeve has one of the shafts securely extending therethrough. Each sleeve has two notches defined in the outer end thereof.

The primary object of the present invention is to provide a laser level assembly wherein the shafts are securely connected to the block at multiple points, and the shafts are pivotably connected to the bearing, so that the laser level assembly can be cooperated with the laser unit of different sizes and weights.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
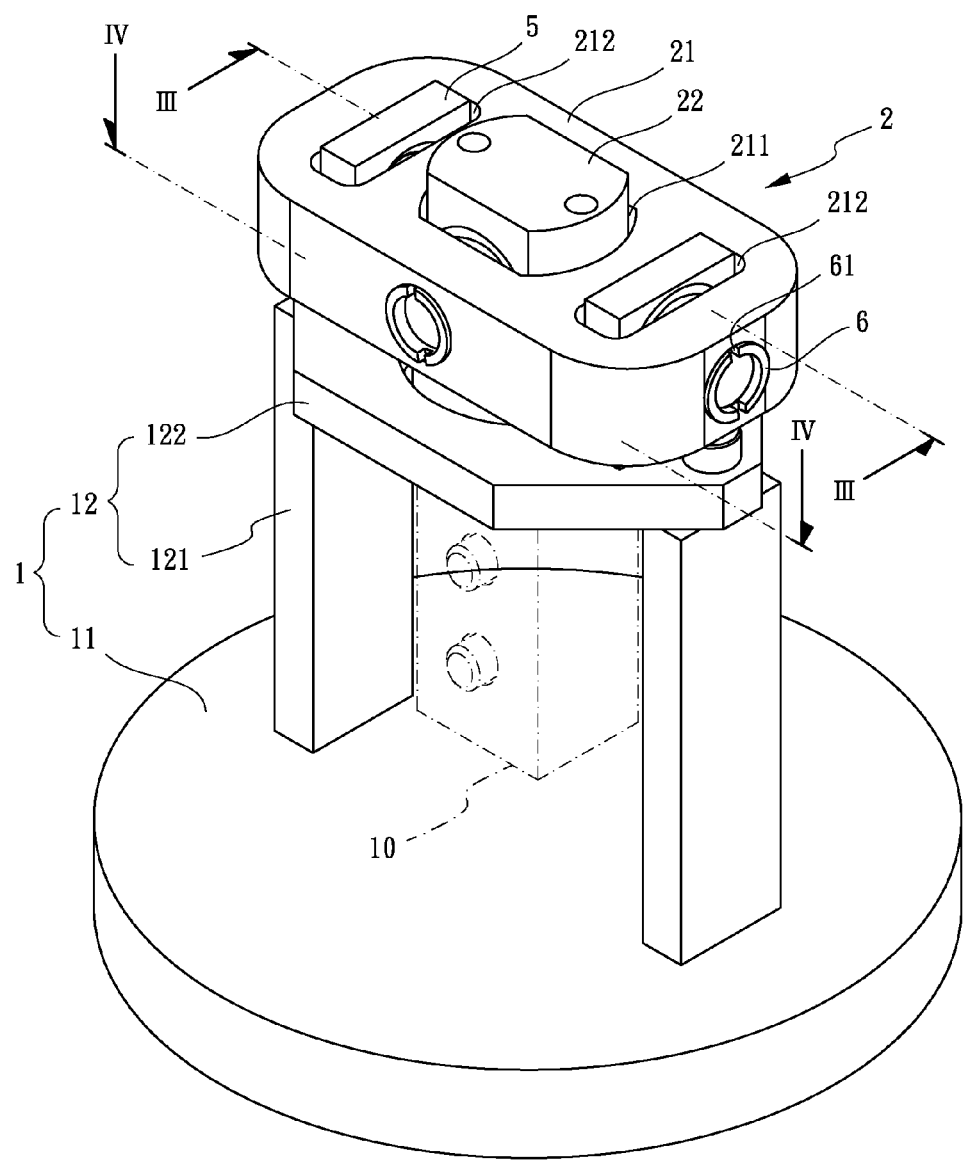
FIG. 1 is a perspective view to show the laser level assembly of the present invention.
Figure 2:
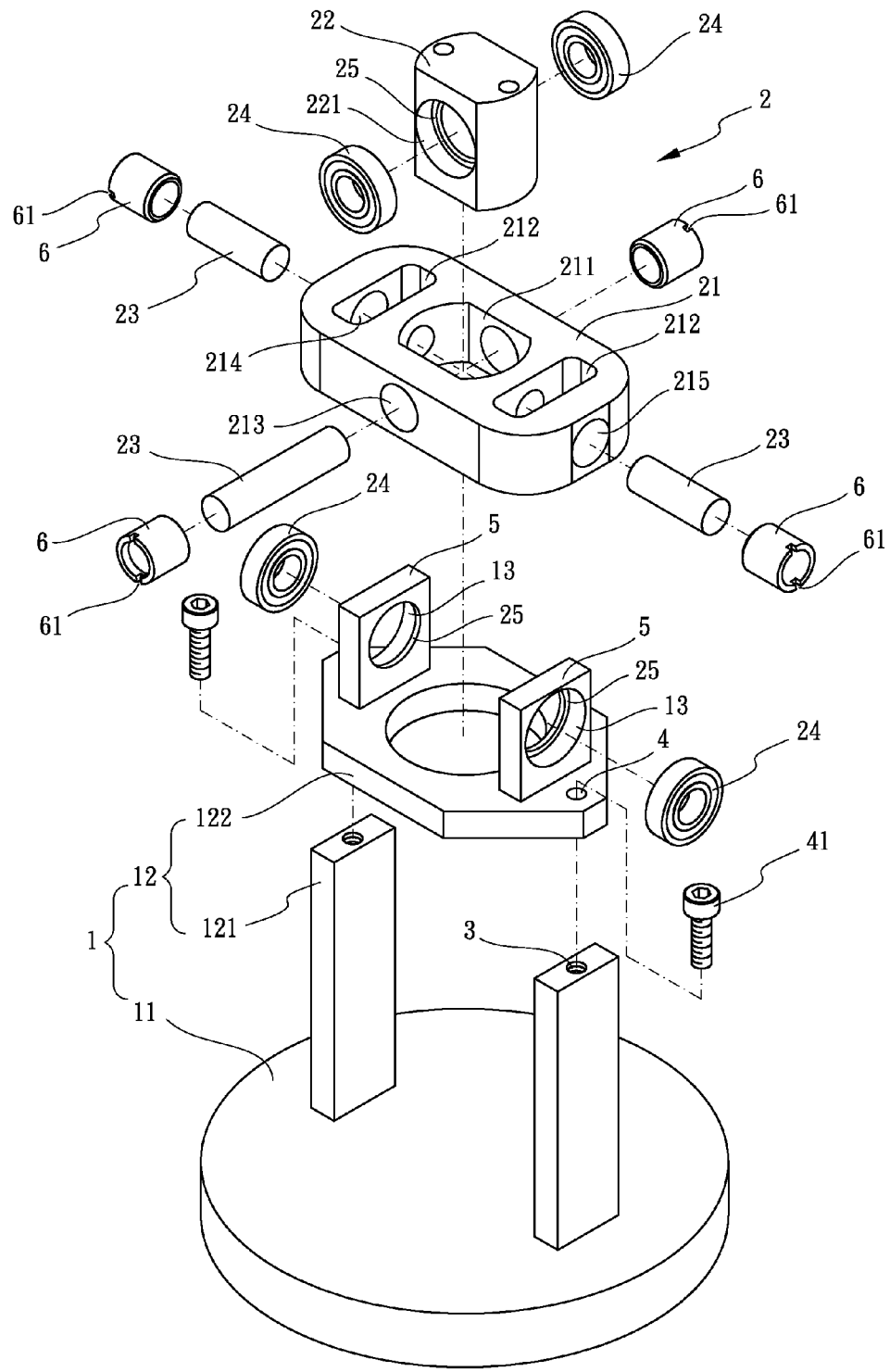
FIG. 2 is an exploded view of the laser level assembly of the present invention.
Figure 3:
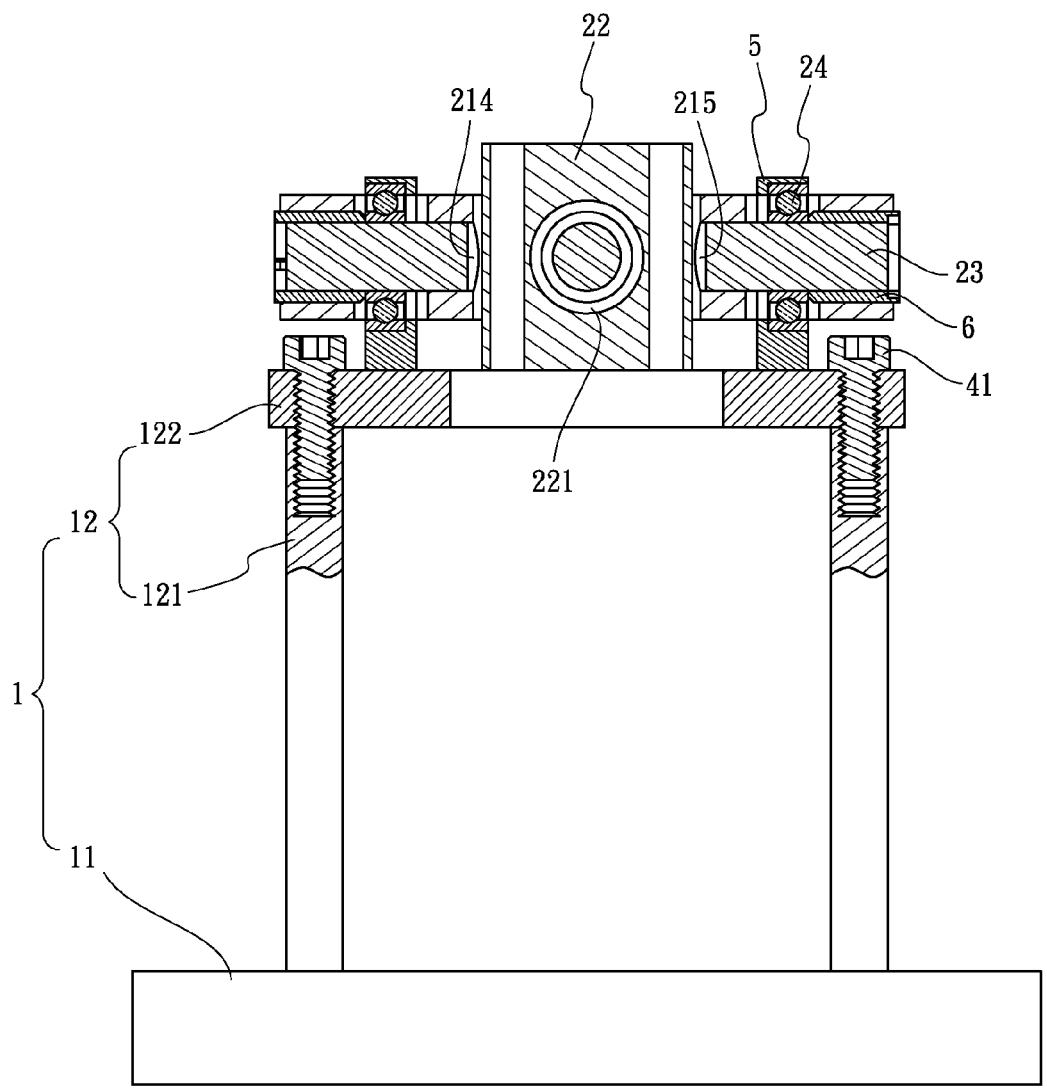
FIG. 3 is a cross sectional view, taken along line III-III of FIG. 1.
Figure 4:
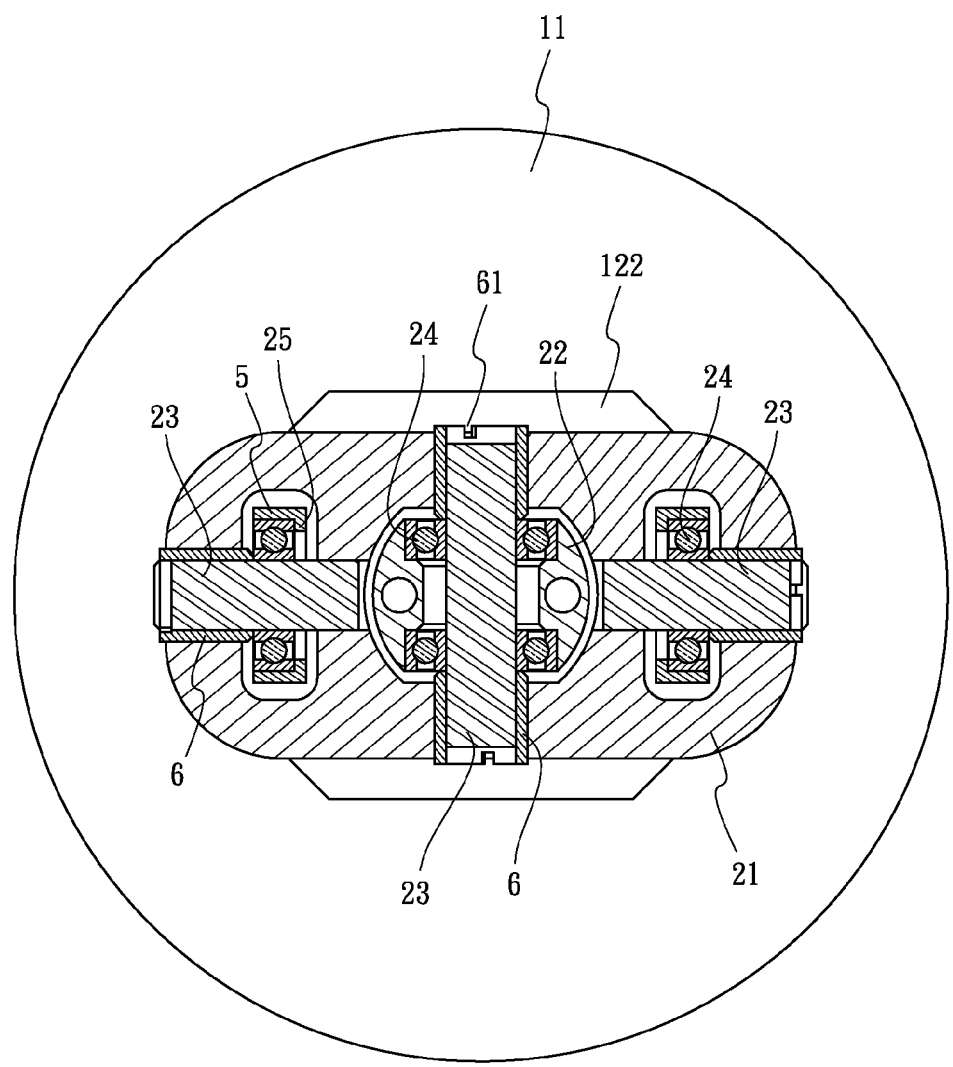
FIG. 4 is a cross sectional view, taken along line IV-IV of FIG. 1.

Referring to FIGS. 1 to 4, the laser level assembly of the present invention comprises a base kit 1 and an adjustment unit 2. The base kit 1 has a base 11 and a frame unit 12 which is connected to the base 11. The frame unit 12 includes two posts 121 extending perpendicularly from the top of the base 11, and each post 121 has a threaded hole 3 defined in the distal end thereof. A connection member 122 is connected to two respective distal ends of the two posts 121 by extending two bolts 41 through two holes 4 in the two ends of the connection member 122 and threadedly connected to the threaded holes 3 of the two posts 121. Two lugs 5 extend perpendicularly from the top of the connection member 122 and each lug 5 has an installation hole 13. A hole is defined through the connection member 122 and located between the two lugs 5.

The adjustment unit 2 having a block 21, a pivotal member 22, multiple shafts 23 and multiple bearings 24. The block 21 has a first hole 211 defined through the center thereof. Two second holes 212 are located on two ends of the first hole 211. Two first shaft holes 213, two second shaft holes 214 and two third shaft holes 215 are defined through the block 21, wherein the first shaft holes 213 communicate with the first hole 211, the second shaft holes 214 communicate with one of the two second holes 212, the third shaft holes 215 communicate with the other one of the two second holes 212. The axis of the two first shaft holes 213 is perpendicular to the axis of each of the second shaft holes 214 and the third shaft holes 215. The two lugs 5 are inserted into the two second holes 212 of the block 21.

The pivotal member 22 is pivotably located in the first hole 211. The pivotal member 22 has an engagement hole 221 which has a flange 25 extending from the inner periphery of the engagement hole 221. Two bearings 24 are installed in two ends of the engagement hole 221 and contact against the flange 25. Each of the two installation holes 13 has a bearing 24 received therein. A flange 25 extends from the inner periphery of each of the installation holes 13. The bearing 24 contacts the flange 25 of the flange 25 in each installation hole 13. One of the shafts 23 extends through the two first shaft holes 213, the first hole 211, the bearing 24 in the engagement hole 221 and the engagement hole 221 of the pivotal member 22. The shaft 23 extends through the first shaft holes 213 contacting the inside of each of the two first shaft holes 213 and the bearings 24 in the pivotal member 22 at multiple points.

Another one shaft 23 extends through one of the installation holes 13 and the bearing 24 in the installation hole 13, and the two second shaft holes 214. The shaft 23 does not reach into the first hole 211. The shaft 23 extending through the second shaft holes 214 contacts the inside of each of the two second shaft holes 214 and the bearing 24 in the installation hole 13 at multiple points.

Yet another one shaft 23 extends through the other one of the installation holes 13 and the bearing 24 in the installation hole 13, and the two third shaft holes 215. The shaft 23 does not reach into the first hole 211. The shaft 23 extending through the third shaft holes 215 contacts the inside of each of the two third shaft holes 215 and the bearing 24 in the installation hole 13 at multiple points.

In order to prevent the shafts 23 from dropping from the first, second and third shaft holes 213, 214, 215, each of the two first shaft holes 213, the outer one of the two second shaft holes 214 and the outer one of the two third shaft holes 215 has a sleeve 6 securely received therein. Each sleeve 6 has one of the shafts 23 mentioned above securely extending therethrough. Each sleeve 6 has two notches 61 defined in the outer end thereof. The notches 61 allow the user to use a hand tool to install or remove the sleeves 6. Also, the notches 61 allow the sleeves 6 to be slightly expandable to securely contact the inner periphery of the first, second and third shaft holes 213, 214, 215.

The block 21 is pivotable about the two shafts 23 extending through the second and third shaft holes 214, 215. The pivotal member 22 is pivotable about the shaft 23 extending through the first shaft holes 213, and is pivotable relative to the block 21.

Figure 5:
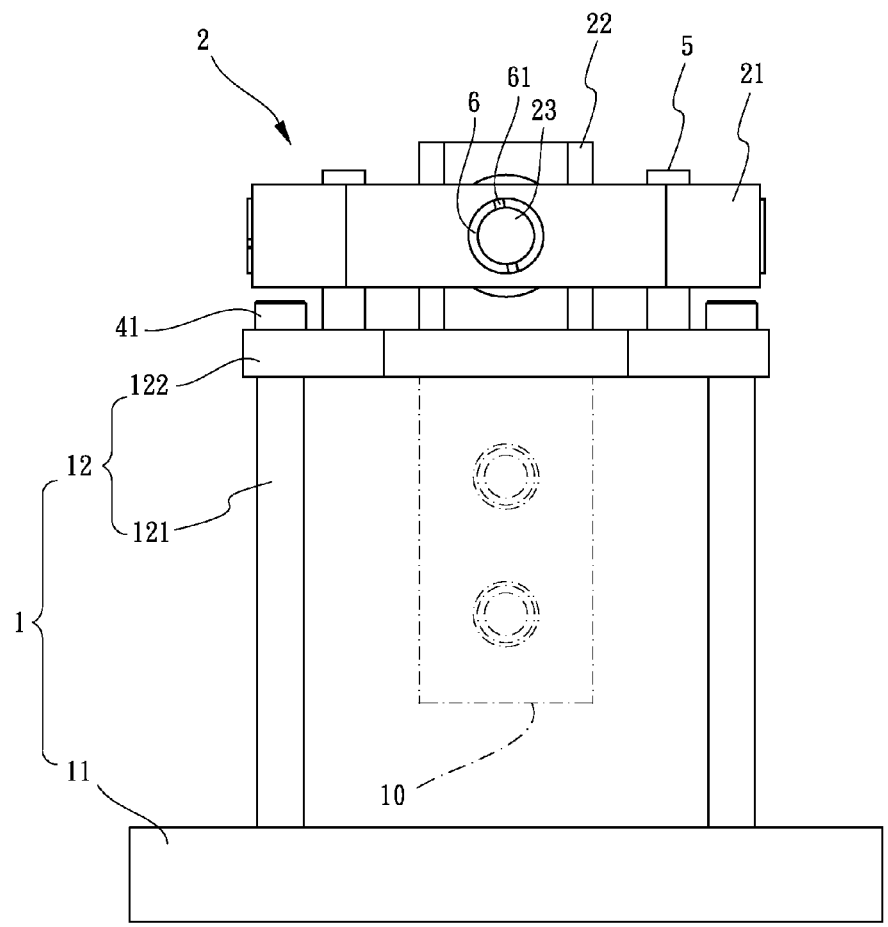
FIG. 5 shows that the laser level assembly of the present invention is not yet put on an inclined floor.
Figure 6:
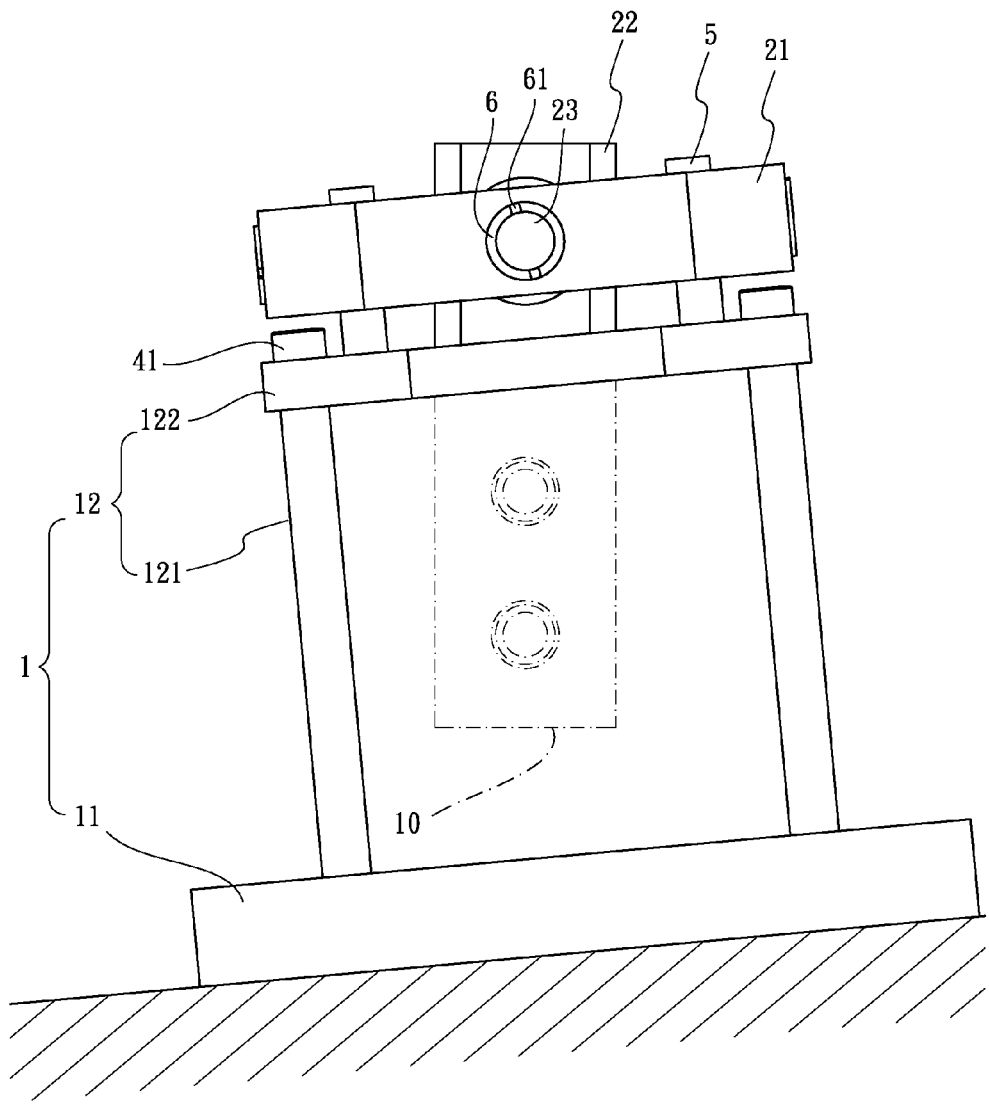
FIG. 6 shows that the laser level assembly of the present invention is put on an inclined floor, and the laser unit is pivoted an angle relative to the floor.
Figure 7:
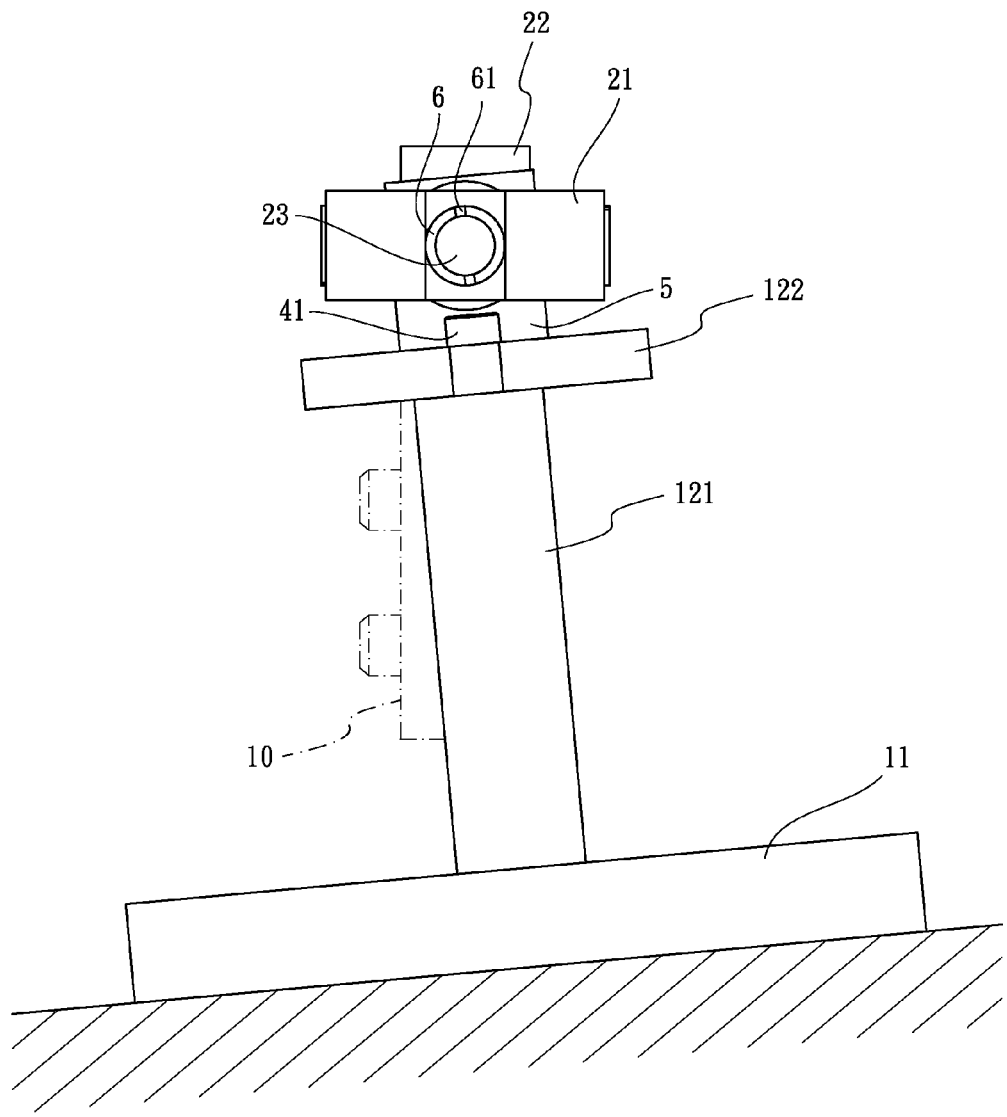
FIG. 7 is a side view to show the laser level is pivoted relative to the floor.

As shown in FIGS. 5 to 7, the laser unit 10 is connected with the pivotable member 22, when the laser level assembly is put on an inclined floor, the pivotable member 22 is pivoted as shown in FIG. 6, and the block 21 is pivoted as shown in FIG. 7, therefore, the laser unit 10 can be always maintained at the position where the longitudinal axis of the laser unit 10 is perpendicular to the horizontal plane. In other words, the laser beams generated by the laser unit 10 can be sure to be parallel to the horizontal plane regardless of the inclination of the floor that the base kit 1 is put.

It is noted that the pivotable member 22 can also be installed in the first hole 211 while the pivotable member 22 is pivotable relative to the axis of the second and third shaft holes 214, 215.

Figure 8:
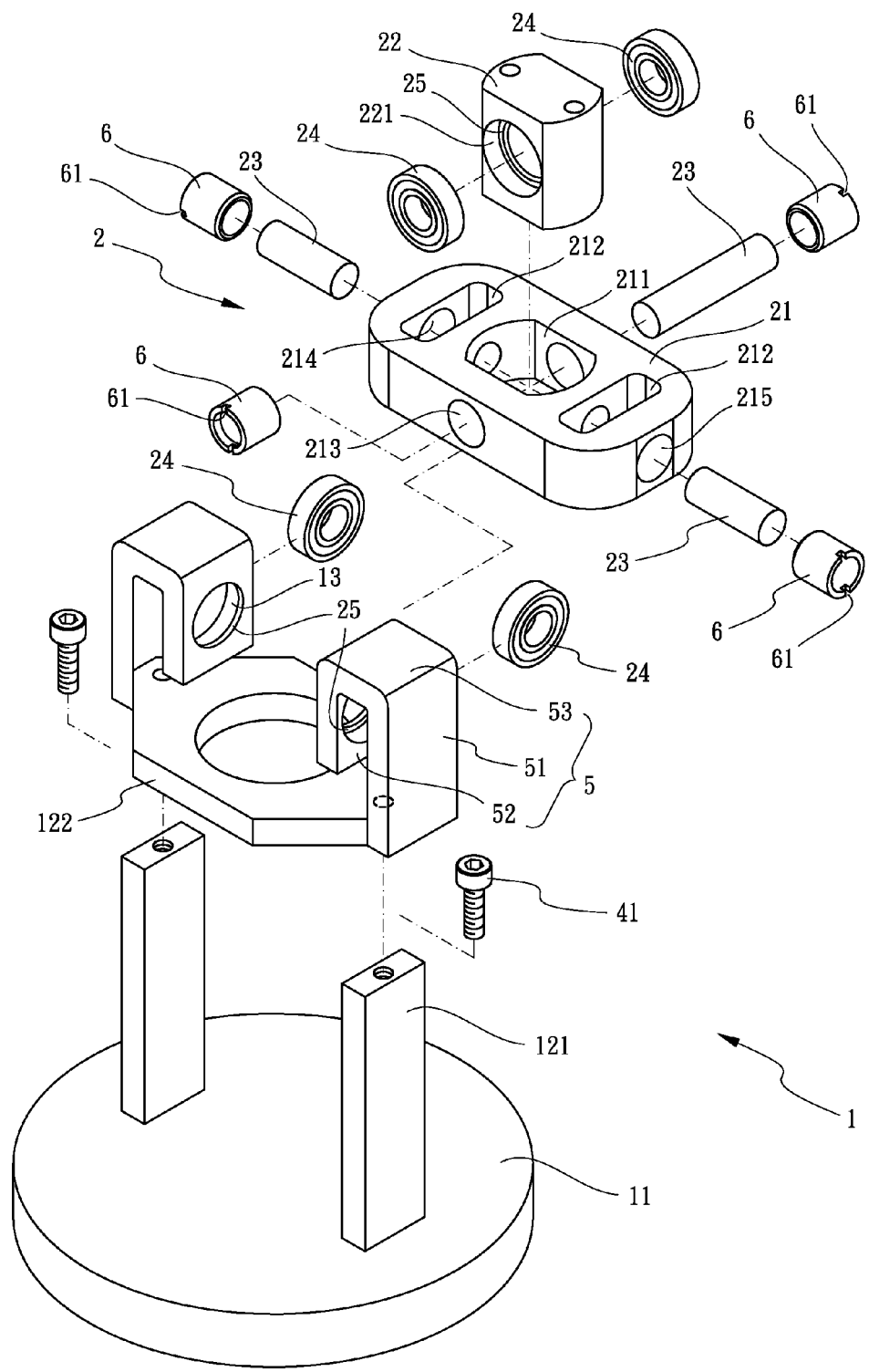
FIG. 8 is an exploded view of the second embodiment of the laser level assembly of the present invention.

FIG. 8 shows the second embodiment of the present invention, wherein the difference is the shape of the two lugs 5, each if the two lugs 5 is an inverted U-shaped lug and includes a first section 51, a second section 52 and a connection section 53 connected between the first and second sections 51, 52. The first and second sections 51, 52 are parallel to each other. The two second sections 52 each have a distance from the top of the connection member 12, and each of the two second sections 52 has one of the two installation holes 13. The block 21 is inserted between the two second sections 52 and the top of the connection member 12, and the two second sections 52 are inserted into the two second holes 212.

The present invention has only two posts 121 on the base 11, and the connection member 122 is sized to be connected to the distal ends of the connection member 122. The base kit 1 is compact and easily to be stored and carried. The laser unit 10 can be positioned more close to a wall. The shafts 23 contact the bearings 24 and the block 21 at multiple points so that when the laser unit 10 is pivoted, the wearing to the bearings 24 is reduced.

While we have shown and described the embodiment in accordance with the present invention, it should be clear to those skilled in the art that further embodiments may be made without departing from the scope of the present invention.

What is claimed is:

1. A laser level assembly comprising:
a base kit having a base and a frame unit connected to the base, the frame unit having one end connected to the base, the other end of the frame unit pivotably connected to an adjustment unit, the frame unit having two installation holes;

the adjustment unit having a block, a pivotal member, multiple shafts and multiple bearings, the block having a first hole defined through a center thereof, two second holes located on two ends of the first hole, two first shaft holes, two second shaft holes and two third shaft holes defined through the block, the first shaft holes communicating with the first hole, the second shaft holes communicating with one of the two second holes, the third shaft holes communicating with the other one of the two second holes, an axis of the two first shaft holes being perpendicular to an axis of each of the second shaft holes and the third shaft holes, the pivotal member pivotably located in the first hole, the pivotal member having an engagement hole, each of the two installation holes having a bearing received therein, another bearing received in the engagement hole, each of the two installation holes and the engagement hole having a flange projecting from an inner periphery thereof so as to be in contact with the bearing corresponding thereto, one of the shafts extending through the two first shaft holes, the bearing in the engagement hole and the engagement hole of the pivotal member, the shaft extending through the first shaft holes contacting an inside of each of the two first shaft holes and the bearings in the pivotal member at multiple points, another one shaft extending through one of the installation holes and the bearing in the installation hole, and the two second shaft holes, the shaft extending through the second shaft holes contacting an inside of each of the two second shaft holes and the bearing in the installation hole at multiple points, yet another one shaft extending through the other one of the installation holes and the bearing in the installation hole, and the two third shaft holes, the shaft extending through the third shaft holes contacting an inside of each of the two third shaft holes and the bearing in the installation hole at multiple points, the block being pivotable about the two shafts extending through the second and third shaft holes, the pivotal member being pivotable about the shaft extending through the first shaft holes, and being pivotable relative to the block.

2. The laser level assembly as claimed in claim 1, wherein the frame unit has two posts extending from the base, a connection member is connected to two respective distal ends of the two posts, two lugs extend from a top of the connection member and each lug has one of the installation holes, the two lugs are inserted into the two second holes of the block.

3. The laser level assembly as claimed in claim 2, wherein the two lugs are perpendicular to the connection member.

4. The laser level assembly as claimed in claim 2, wherein the two lugs each have a first section, a second section and a connection section connected between the first and second sections, the first and second sections are parallel to each other, the two second sections each have a distance from the top of the connection member, each of the two second sections has one of the two installation holes, the block is inserted between the two second sections and the top of the connection member, the two second sections are inserted into the two second holes.

5. The laser level assembly as claimed in claim 1, wherein each of the two first shaft holes, one of the two second shaft holes and one of the two third shaft holes has a sleeve securely received therein, each sleeve has one of the shafts securely extending therethrough, each sleeve has two notches defined in an outer end thereof.

* * * * *